United States Patent [19]

Allen

[11] 3,717,167
[45] Feb. 20, 1973

[54] FLOW LIMITER AND RELIEF VALVE-BELLEVILLE WASHER

[75] Inventor: Thomas E. Allen, Mustang, Okla.

[73] Assignee: Caterpillar Tractor Co., Peoria, Ill.

[22] Filed: July 19, 1971

[21] Appl. No.: 163,594

[52] U.S. Cl. ............... 137/117, 137/596.12, 91/446
[51] Int. Cl. .............................................. F16k 17/22
[58] Field of Search ......... 137/508, 116, 117, 512.5, 137/512.15, 513.3, 504, 517, 116.5, 529, 115, 101, 596.12; 138/45, 46, DIG. 5

[56] References Cited

UNITED STATES PATENTS

| | | | |
|---|---|---|---|
| 2,655,935 | 10/1953 | Kinzbach | 137/529 |
| 3,532,128 | 10/1970 | Webb | 138/45 |
| 2,938,538 | 5/1960 | Allen | 137/504 |
| 3,395,722 | 8/1968 | Heinrich | 137/117 |
| 3,001,799 | 9/1961 | Plume | 137/513.3 |

FOREIGN PATENTS OR APPLICATIONS 896,463   11/1953   Germany ............... 137/508

*Primary Examiner*—Martin P. Schwadron
*Attorney*—Charles M. Fryer et al.

[57] ABSTRACT

A combination flow limiter and relief valve comprises a plurality of conically shaped spring washers which are arranged in series against an orificed plate to bias the plate against flow from an inlet. The washers and plate are preloaded in a chamber in a housing to form a resilient barrier between inlet and outlet openings. Pressure differential across the plate alters the bias of the washers and thus the pressure at which they will open to permit fluid flow past their outer diameter.

7 Claims, 4 Drawing Figures

3,717,167
SHEET 1 OF 2
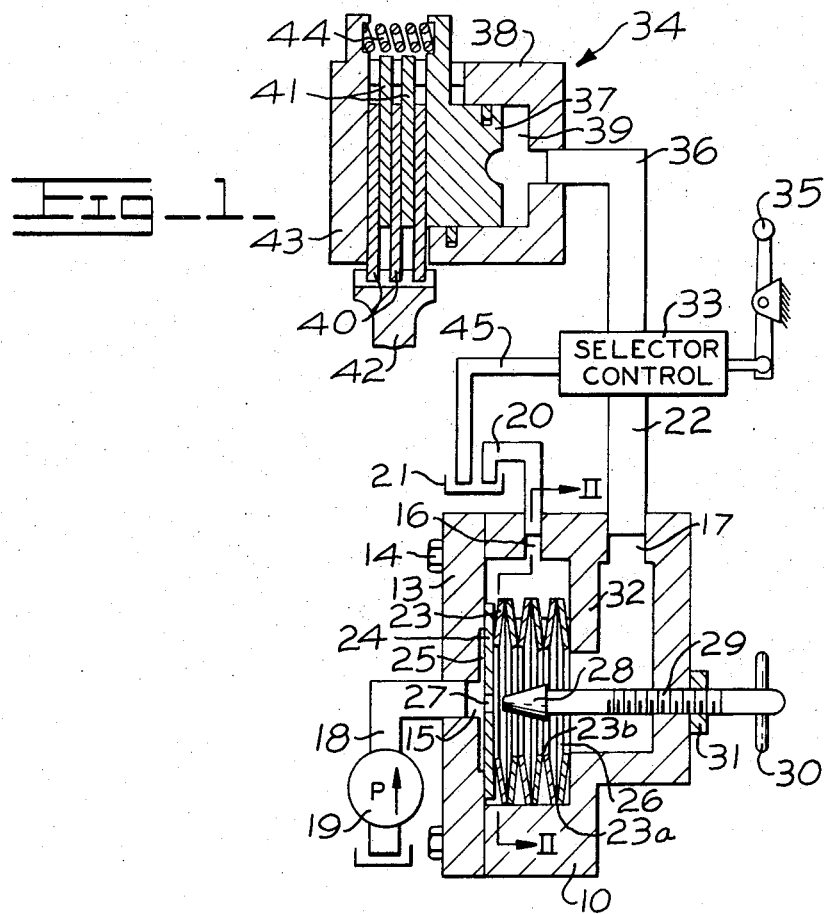
Fig_1_
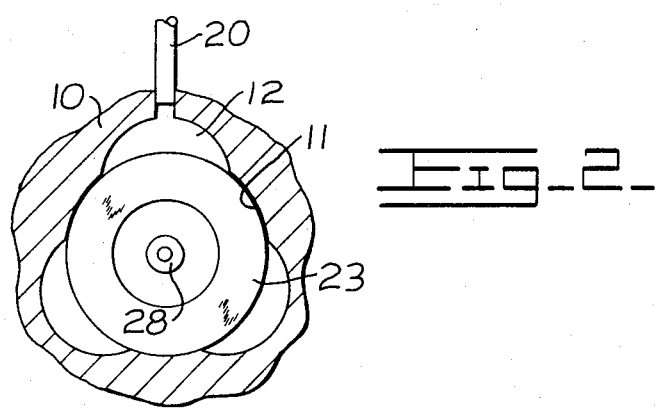
Fig_2_
INVENTOR
THOMAS E. ALLEN
BY
Fryer, Tjensvold, Feix, Phillips & Lempio
ATTORNEYS

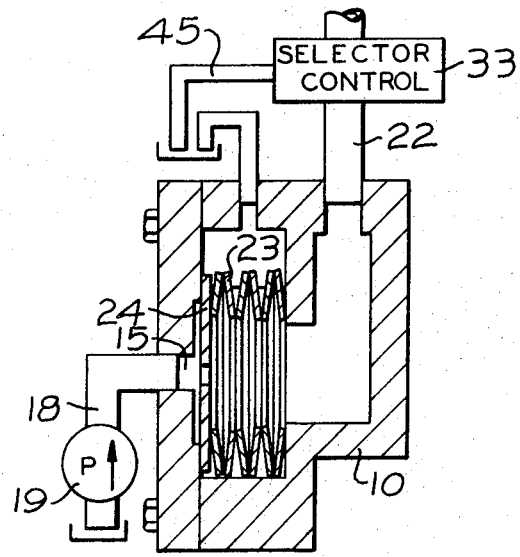
FIG-3-
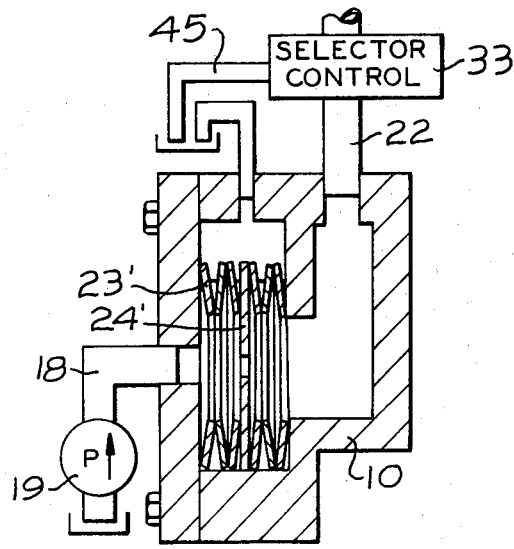
FIG-4-

FLOW LIMITER AND RELIEF VALVE-BELLEVILLE WASHER

BACKGROUND OF THE INVENTION

The present invention relates to valves and pertains more particularly to a flow limiting Belleville relief valve.

Conventional methods of regulating and modulating fluids utilize complex and expensive valve arrangements. These valves normally comprise a spool valve which moves across the flow path. Such spools are expensive and subject to sticking because of close fit tolerances. Also because of their size and mass, they consume valuable space and tend to be sluggish in operation.

SUMMARY OF THE INVENTION

The primary object of the present invention is to provide a combination flow limiter and relief valve which is compact, reliable, and inexpensive.

Another object of the present invention is to provide a flow limiter valve that is instantaneous in operation and is not subject to sticking or jamming.

In accordance with the present invention a plurality of Belleville type spring washers are confined in a housing so as to form a resilient barrier between fluid openings formed in said housing. A circular plate having an orifice therethrough is biased towards the fluid inlet opening by the spring washers and is responsive to fluid pressure differential across the plate to limit the rate of maximum fluid flow during the transient condition while allowing a maximum pressure relief via the outer diameter of the washers at the end of the transient period.

BRIEF DESCRIPTION OF THE DRAWINGS

The above and other objects and advantages of the present invention will become apparent from the following description when read in conjunction with the accompanying drawings in which:

FIG. 1 is a sectional view of a preferred embodiment of the present invention shown in conjunction with a typical control system;

FIG. 2 is a view generally along lines II—II of FIG. 1.

FIG. 3 is a sectional view of an alternate embodiment of the present invention.

FIG. 4 is a sectional view of another embodiment of the present invention.

DETAILED DESCRIPTION OF THE DRAWINGS

Referring now to the drawings, there is disclosed a preferred embodiment of a flow limiter valve in accordance with the present invention shown in conjunction with a typical control system. The flow limiter valve comprises a housing 10 formed to define a substantially cylindrical central chamber 11 and a plurality of radially extending drain or relief cavities 12. A cover 13 held in place such as by means of a plurality of cap screws 14 encloses the chamber 11. The housing 10 includes an inlet opening 15 and outlet openings 16 and 17 respectively. The inlet opening 15 communicates such as by means of a conduit 18 with a source 19 of pressurized fluid. The outlet opening 16 communicates by means of a conduit 20 to a sump 21. The outlet opening 17 communicates by means of a conduit 22 with a control system as will be discussed later. A plurality of Belleville type spring washers 23 together with a circular plate 24 are stacked in the chamber 11 to form a cavity 25 formed by a counterbore and cavity 26 separating the inlet and outlet pressurized fluid of the housing. The plate 24 has an orifice 27 formed therein to permit a limited flow of fluid therethrough.

Obstruction means in form of a needle valve comprising a tapered plug 28 carried on the end of an adjustable stem 29 is provided for selectively obstructing or restricting the flow of fluid through orifice 27. The stem 29 is provided with a suitable handle, such as a T-bar 30, and suitable locking means, such as a nut 31. The Belleville type spring washers 23 are selected to have a predetermined preload between cover 13 and a wall 32 of the housing 10. The washers 23 are alternately in sealing engagement at their outer diameters 23a and at their inner diameters 23b, and thereby form a barrier or wall preventing a flow of fluid from inner cavities 25 and 26 to the drain or relief cavities 12.

The flow limiter valve just described may be included in any suitable control system such as that illustrated, and connected such as by conduit 22 to a selector control 33 which is operative to selectively control a plurality of fluid pressure responsive systems such as a clutch or brake 34. The selector control means 33 includes a control selector 35 and is connected such as by means of conduit 36 to a fluid actuator including a piston 37 in a cylinder 38. The piston 37 is responsive to fluid pressure contained in chamber 39 to move to the left to clamp a plurality of disc 40 between a number of plates 41 to establish a connection between a rotary member 42 and a second member 43. A spring 44 releases the clamping pressure when fluid pressure in the chamber 39 is relieved. A conduit 45 communicates between the selector control 33 and a sump 21 for diverting fluid thereto when pressure is relieved from the actuator chamber 39.

In operation, the valve functions essentially as a flow limiter and relief valve. Fluid is supplied to the valve from pump 19, flows into cavity 25 and through orifice 27 at a rate that will be predominantly a function of the restriction as determined by the orifice 27 and the position of the adjustable obstructing means 28. The disc 24 responds to a large pressure differential between cavities 25 and 26 to move to the right and thus lessen the preload of plate 24 against housing 13 by washers 23 which permits a buildup of pressure in 25 to overcome this sealing around the outer diameter of the plate and thus permit a flow of fluid thereby into the drain or relief cavities 12 which then flows through conduit 20 back to the sump 21. The drop in pressure in cavity 26 results, for example, when selector control 33 is set to relieve pressure in chamber 39 and to divert flow of conduit 22 back to sump 21 by means of conduit 45. Likewise the pressure builds up in cavity 26 such as, for example, when piston 37 is bottomed out in the actuated position. This pressure buildup in cavity 26 results in a decrease in the pressure differential across disc 24 and consequently the disc moves to the left under bias from the springs or washers 23 to the right thereof. This results in a resealing of the disc or plate 24 around the outer diameters until the pressure in 25 rises to a higher predetermined level. If the pressure in cavity 25 continues to build up beyond relief setting of the washers 23, the washers will again deflect and let plate 24 unseal at the outer diameter and permit a flow of fluid thereby and thus limit the upper pressure felt in the system such as beyond conduit 22.

Referring now to FIG. 3, there is disclosed a modification of the embodiment of FIG. 1 wherein identical elements are identified with the same reference numerals. This FIG. 3 embodiment differs from the FIG. 1 embodiment by omission of the needle valve. Thus in this embodiment there is no adjusting means to adjust the flow through the orifice. The flow characteristics are pre-determined by pre-selecting the Belleville type spring washers 23 and the orificed plate 24. The washers 23 are selected to maintain a pre-determined bias against the orificed plate 24 to bias the plate against the flow from inlet 15.

Another embodiment is illustrated in FIG. 4 wherein an orificed plate 24' is disposed between two stacks of Belleville type spring washers. This arrangement will permit less deflection because there are less washers downstream of the plate 24'. Another result of this arrangement is that relief can occur past the outer diameter of the first upstream washer 23' and also past the outer diameters of the next pair of washers in the series upstream of the disc 24'.

Thus I have provided a flow limiter and relief valve comprising a series of Belleville type spring washers that are disposed in a control circuit, and is adapted to control the flow of fluid through at least a portion of said control circuit.

While my invention has been described with reference to specific embodiments it is to be understood that many changes and modifications may be made in the illustrated embodiments of the present invention without departing from the spirit and scope thereof as defined in the appended claims.

What is claimed is:

1. A flow limiter and relief valve, said valve comprising:
    a housing having a chamber formed therein;
    inlet and outlet openings communicating with said chamber;
    a source of pressurized fluid communicating with said inlet opening;
    a plurality of Belleville type spring washers urging an orificed plate against the flow of fluid in said housing to form a resilient flow limiting barrier between said inlet and outlet openings;
    an adjustable obstruction means associated with said housing and operative to adjustably obstruct said orifice to alter a pressure differential between the upstream and downstream sides of said plate;
    a drain cavity formed in said housing along adjacent the outer diameter of said washers; and,
    said washers being responsive to a predetermined pressure acting thereon to permit fluid to flow past the outer diameter thereof into said drain cavity.

2. A fluid flow limiter valve for controlling the flow of fluid along a path, said valve comprising:
    a plate having an orifice therein disposed across said fluid path;
    a plurality of Belleville type spring washers disposed downstream of said plate to bias said plate against said fluid flow; and,
    a relief chamber disposed to communicate with the periphery of said washers.

3. The invention of claim 2 comprising a plurality of said washers disposed upstream of said orificed plate.

4. The invention of claim 3 comprising an adjustable needle valve disposed for adjustably restricting said orifice.

5. The invention of claim 2 comprising an adjustable needle valve disposed for adjustably restricting said orifice.

6. A flow limiter valve, said valve comprising:
    a housing having a chamber formed therein;
    inlet and outlet openings communicating with said chamber;
    a source of pressurized fluid communicating with said inlet opening;
    a circular plate positioned in said housing;
    a plurality of Belleville type spring washers operatively engaging said plate and operative therewith to form a resilient barrier to said fluid between said inlet and outlet openings;
    an orifice formed in the center of said plate to permit a limited flow of fluid therethrough;
    a drain cavity formed in said housing along adjacent the outer diameter of said washers;
    said washers being responsive to a predetermined pressure to permit fluid to flow past the outer diameter thereof into said drain cavity.

7. The invention of claim 6 comprising means to adjustably obstruct said orifice.

* * * * *